United States Patent
Eftekhari et al.

(10) Patent No.: US 10,264,127 B1
(45) Date of Patent: *Apr. 16, 2019

(54) EMOTION RECOGNITION TO MATCH SUPPORT AGENTS WITH CUSTOMERS

(71) Applicant: INTUIT INC., Mountain View, CA (US)

(72) Inventors: Amir Eftekhari, Mountain View, CA (US); Aliza Carpio, San Diego, CA (US); Joseph Elwell, San Diego, CA (US); Damien O'Malley, San Diego, CA (US)

(73) Assignee: INTUIT, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/947,452

(22) Filed: Apr. 6, 2018

Related U.S. Application Data

(63) Continuation of application No. 15/589,520, filed on May 8, 2017, now Pat. No. 9,967,400, which is a continuation of application No. 15/162,144, filed on May 23, 2016, now Pat. No. 9,648,171.

(51) Int. Cl.
| | |
|---|---|
| *H04M 3/00* | (2006.01) |
| *H04M 5/00* | (2006.01) |
| *H04M 3/523* | (2006.01) |
| *G06Q 30/00* | (2012.01) |

(52) U.S. Cl.
CPC ........ *H04M 3/5232* (2013.01); *G06Q 30/016* (2013.01); *H04M 2203/408* (2013.01)

(58) Field of Classification Search
CPC .. H04M 3/5232; H04M 3/5175; H04M 3/523; H04M 2250/12; H04M 2203/401

USPC ........... 379/265.11, 265.13, 265.12, 266.08, 379/265.06, 265.05, 265.01
See application file for complete search history.

(56) References Cited

U.S. PATENT DOCUMENTS

| | | | |
|---|---|---|---|
| 8,130,935 B1 | 3/2012 | Coughlan et al. | |
| 9,723,149 B2 | 8/2017 | Meng et al. | |
| 2016/0065732 A1* | 3/2016 | Davis | H04M 3/51 379/265.02 |

FOREIGN PATENT DOCUMENTS

| | | |
|---|---|---|
| EP | 2887627 A1 | 6/2015 |

OTHER PUBLICATIONS

Leh Luoh et al., "Image processing based emotion recognition", System Science and Engineering (ICSSE), 2010 International Conference On, IEEE, Jul. 1, 2010, pp. 491-494.

(Continued)

*Primary Examiner* — Thjuan K Addy
(74) *Attorney, Agent, or Firm* — Patterson + Sheridan, LLP

(57) ABSTRACT

An application determines an emotional state of a user based on evaluating facial recognition data of the user captured from the user interacting with the application. The application receives a request from the user to initiate a support call. The request identifies the emotional state of the user. The application predicts, from a set of outcomes of support calls processed by support agents interacting with users having different emotional states, an emotional state that increases a likelihood of achieving a specified outcome for the support call based on the emotional state of the user. The application identifies an available support agent having the predicted emotional state, and assigns the user to interact with the identified support agent for the support call.

20 Claims, 9 Drawing Sheets

(56) References Cited

OTHER PUBLICATIONS

International Search Report and Written Opinion dated May 11, 2017.

\* cited by examiner

EMOTION RECOGNITION TO MATCH SUPPORT AGENTS WITH CUSTOMERS

CROSS-REFERENCE TO RELATED APPLICATIONS

This application is a continuation of application Ser. No. 15/589,520, filed on May 8, 2017, which is a continuation of application Ser. No. 15/162,144, filed on May 23, 2016, now U.S. Pat. No. 9,648,171, both of which are incorporated by reference herein in their entirety.

BACKGROUND

The present disclosure generally relates to techniques for identifying support agents, and more specifically, to techniques for matching customer support agents with users in real-time based on agents' emotional states.

Complex software applications and services are frequently made available to users over computer networks, such as the Internet. For example, software applications used to prepare and file income tax returns are frequently offered as an online service. In addition to generating tax return documents, these online services typically guide a user through a collection of complex interactive workflows in order to prepare a complete, valid income tax return.

Other online services allow users to access software applications used to prepare a variety of other legal and formal documents. For example, online services are available which direct a user through a guided interaction to generate estate planning documents, corporate entity documents, legal filings, etc. Still other complex software applications accessed as an online service include financial service applications which allow users to complete mortgage applications or apply for home, life, or automobile insurance.

In addition to these primarily transactional online services, a variety of complex software tools offer users access to both online services and local client applications, e.g., financial accounting software, video editing or media composition software, software development tools, etc. Such applications may allow users to access application features and user data stored online, regardless of whether the application is installed locally by an end user or accessed as an online service. Once customer data is stored by a service provider, end users can access their data using a variety of clients, including a web browser used to access a software application as a series of web pages, dedicated "thin" client applications, and so-called "apps" accessed using a mobile telephone or computing tablet.

Further, service providers often provide users with the option to interact with customer support agents in order to assist users in accomplishing a given task (e.g., guiding users through a workflow provided by the service that allows the user to file a tax return), explain a given feature, troubleshoot problems encountered by the user while interacting with the service, and the like. For example, support agents can interact with users via chat rooms, video chat, telephone calls, and the like. Such assisted support services may be provided in addition to self-help content, user guides, and other documentation to assist users in accomplishing a given task. Additionally, service providers may provide users the option to interact with support agents generally at any point in time (e.g., before and/or after users have attempted to use self-support content to accomplish a task). For popular applications and services, the interaction between support agents and users can represent a large part of the overall customer service provided to users.

BRIEF SUMMARY

One embodiment presented herein includes a method for matching a user of an application to a support agent. The method generally includes receiving facial recognition data of the user captured from the user interacting with the application. The method also includes evaluating the facial recognition data to determine at least one emotional state of the user. The method further includes, upon receiving a request from the user to initiate a support call, wherein the request identifies the at least one emotional state of the user: predicting, from a set of outcomes of support calls processed by support agents interacting with users having different emotional states, an emotional state that increases a likelihood of achieving a specified outcome for the support call based on the at least one emotional state of the user; identifying an available support agent having the predicted emotional state; and assigning the user to interact with the identified support agent for the support call.

Additional embodiments include a system having a processor and a memory storing one or more application programs configured to perform the methods disclosed herein and a computer-readable storage medium storing instructions, which when executed on a processor perform the methods disclosed herein.

DETAILED DESCRIPTION

Figure 1:
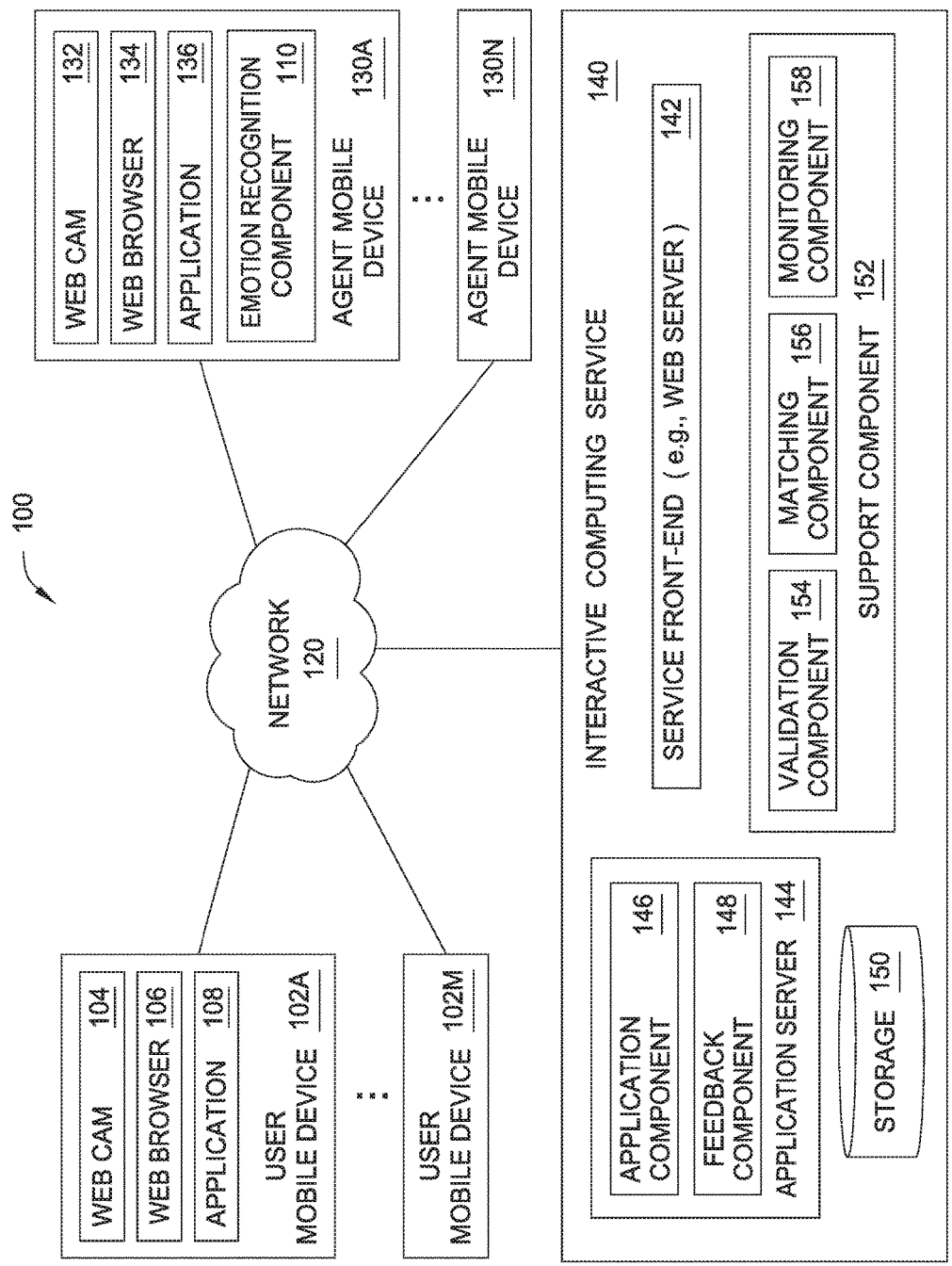
FIG. 1 illustrates an example of a computing environment used to provide an interactive computing service with assisted support, according to one embodiment.

Embodiments presented herein provide techniques for matching support agents with users that interact with assisted support based on emotional states of support agents. More specifically, embodiments presented herein build a history of the impact that different emotional states of support agents, support topics, user characteristics, etc. have on the outcome of a support request, in order to determine which emotional states of agents are associated with favorable support call outcomes. Such information is then accounted for (e.g., in addition to other criteria such as agent availability, agent skills, etc.) when matching a user to a particular support agent, for example, in order to increase the possibility of achieving a favorable outcome for the support call and reduce support time.

For example, software applications or online services often include an assisted support feature that allows users to interact with a support agent in order to accomplish a particular task (e.g., in a video chat session). Using an online tax preparation service as a reference example, a user can request to interact with a support agent via a video chat in order to receive assistance with preparing a tax return using the service. In another example, a user can receive assistance from a support agent regarding problems the user may be experiencing when using the tax preparation service. Further, in other examples, a user can request assistance from a support service hosted by service providers that allow users to complete mortgage applications, generate legal documents, apply for life insurance, and perform other tasks related to building complex documents.

Typically, once a user requests to interact with a support agent, the online service matches (or assigns) a support agent to the user based on a particular topic (e.g., what particular area or issue the user wants help with), availability of support agents, support queue (e.g., number of users currently waiting to receive assistance from an available support agent), skills of the support agents, and other criteria associated with different types of issues the user may encounter or availability of resources. However, matching agents to users in this manner (e.g., based on a certain topic and/or availability of a resource) does not account for emotional states of the user and the support agent, as well as the support agent's ability to handle different emotional situations.

For example, users may only decide to access an assisted support feature as a last resort in attempt to resolve a particular problem. Continuing with the example of an online tax preparation service, a user having trouble updating a previous year's tax return may have reviewed self-support content (e.g., such as searching help content, guides, documentation, user-generated content, etc.) before requesting to access a support service hosted by the online tax preparation service (e.g., in order to interact with a support agent). Consequently, in many cases, by the time a given user decides to request assistance from a support agent, the user may have already invested a significant amount of effort with the tax preparation service to resolve their problem. As a result of such effort, in some cases, the user may express emotions, such as anger, frustration, confusion, etc. when requesting assistance from the online service's assisted support.

Thus, to the degree a given user is exhibiting a particular emotion, it may be helpful for the online service to account for such emotion when matching a support agent to the user, e.g., to improve the user's experience with the support agent and/or increase the likelihood of successfully resolving the user's problem.

Current techniques for evaluating emotional states of support agents, however, are generally inefficient and labor-intensive. Specifically, online services have to invest substantial human costs and time to monitor support agents, interpret their emotional responses during their support calls, and evaluate whether the agents' emotional responses affected the outcome of a given support call. As a result, using current techniques to evaluate emotional states of support agents in real-time in order to improve matching of agents to users may not be feasible.

Examples presented herein provide techniques for matching support agents to users that interact with an online service in real time based on the emotional states of the support agents. In one example, the techniques presented herein use emotion recognition technology (e.g., facial recognition software) to identify a support agent's emotional states while the support agent is interacting (e.g., via a video chat session) with the user. As described below, such facial recognition software can evaluate facial attributes (e.g., such as raised eye brow, lip raise, nose wrinkle, frown, and other visual cues) of the support agent, match the observations to predicted emotional states, and generate confidence scores across a set of emotions for that support agent.

For example, assume a user interacting with an online tax preparation service (via an app on their mobile device) contacts the service using a video-support feature to video chat with a support agent regarding a particular problem (e.g., such as where to find information on the cost of the tax preparation service). Further, assume the support agent uses their mobile device (e.g., smartphone, laptop, etc.) to interact with the user. In such a case, the support agent may be visible to the user in a display (or interface) on the user's mobile device. In addition, the support agent's mobile device may include emotion recognition software that evaluates the agent's facial expressions and other visible cues during the video call and generates emotion recognition data (corresponding to the facial expressions) for the support agent. In one example, the emotion recognition data includes the raw facial (biometric) data sampled from the support agent at different times of the video support call, the particular locations (e.g., coordinates) where the data was sampled, and/or confidence scores for a set of emotions corresponding to the facial recognition data at the different times.

The online service may receive emotion recognition data from several support agents interacting with users. The online service may further receive metadata associated with several support calls and/or feedback from users describing their experience with their respective support agent. The metadata associated with a given support call may include information related to the particular service/product at issue, component or feature of the online service at issue, and/or other identifying information of the user, such as age, marital status, location, etc. The feedback for each support call may indicate whether the support call was successful or resulted in a positive outcome. For example, the feedback may indicate whether the user was satisfied or dissatisfied with the support agent during the support call, whether the support agent resolved the user's reason for contacting the support agent, etc. In some examples, the online service can score outcomes of support calls to generate data for training a model to predict when an (and what) emotional state of a support agent impacts an outcome of a particular support call, in which the support agent is discussing a particular topic, interacting with a user with a particular emotional state, etc.

Once received, the online service can evaluate the feedback, metadata from the support calls and the agents' emotion recognition data to build an emotion profile for each support agent. In one example, the online service can correlate the different outcomes of the agent calls with the emotional responses of the respective agents during the calls and identify which emotional responses of the support agents produce positive support call outcomes. In some examples, the online service may determine whether a support call is positive based on a duration of the support call, success of the support agent in resolving the user's particular issue, review/feedback from the user, and the like. Based on the evaluation, the online service can build an emotional profile for the support agent. The emotion profile for a given support agent can include a history of the agent's emotional responses to different situations. Such situations can include the types of users (e.g., age of user, marital status of user, location of user, etc.), types of issues the agent provided assistance for, emotional states of users, and other criteria of the user and the support request. In addition, the emotion profile can determine when emotional states for different situations impact the outcome for the video support call.

For example, assume that an online service receives emotion recognition data from agents A, B, C for video support calls handled by each agent, feedback from users regarding their experience with the agents during the video support calls, and metadata for the video support calls. In this example, agent A's visual cue data may indicate that agent A expressed "happiness" during the majority of time of agent A's video support calls (e.g., an agent who typically is excited to help customers), agent B's visual cue data may indicate agent B expressed "sadness" or "empathy" during the majority of time of agent B's video support calls, and agent C's visual cue data may indicate agent C expressed "sternness" during the majority of time of agent C's video support calls. In addition, assume that the online service determines (e.g., based on the feedback, metadata, and/or visual cue data) that each of the agents A-C encountered similar types of users during the video support calls, but that agent C had a greater number of positive outcomes associated with his support calls when discussing a particular topic with a user (e.g., agent C's call durations may be shorter relative to the other agents, agent C's has higher ratings from users that interacted with agent C relative to other agents, etc. when agent C discusses tax returns). The online service can evaluate the received information (e.g., facial cue data, feedback, metadata) to build an emotion profile for each agent A-C that indicates the respective agent's history of emotional state responses during the support calls. The online service can also evaluate the emotion profiles of each agent A-C to build a model for determining when an emotional state of an agent impacts outcomes of support calls based on a topic of the support call, inferred (or stated) emotional states of users, etc. Continuing with the above example, the online service may determine from the emotion profiles that the emotion expressed by agent C, "sternness," is associated with positive outcomes for support calls related to tax returns.

In this manner, the techniques presented herein allow an online service to better understand which support agents are providing the optimal emotional response and what emotion response works better to produce optimal outcomes for agent-to-user interactions.

According to some examples presented herein, once the online service builds emotion profiles for the support agents, for a given video call initiated by a user, the online service can match one of the support agents to the user in real time based on the emotion profiles for the support agents, metadata associated with the particular call and/or feedback from the particular user (e.g., which may have been received prior to the call).

For example, the user may have provided feedback about an experience interacting with other support features of an online service prior to submitting a request to interact with a live support agent. The user, in particular, may have done so after becoming dissatisfied or frustrated while interacting with the online service, e.g., when the online service does not provide relevant help or resolve the user's particular problem. In one embodiment, the online service may use this feedback to infer an emotional state of the user. For example, the online service may evaluate the feedback using natural language processing to infer the emotional state of the user.

In some cases, the online service may also determine an emotional state of the user based on emotion recognition data received from the user's mobile device. For example, upon receiving a request from a user to interact with a support agent, the online service may also receive, in the request, the latest emotion data captured by the user's mobile device, and match an agent to the user based on the user's emotional state. In some cases, as described below, the online service can also performing matching based on other support agent criteria such as agent availability, support queue, agent skillsets, etc.

According to some examples, the online service may also include a monitoring feature that monitors support agents' emotions in real-time (e.g., regardless of whether they are interacting with a user). Doing so allows the online service to notify the support agents if they are expressing emotions that deviate from their normal emotional state (e.g., determined from their emotional profiles) and/or adjust the emotional profiles of agents (e.g., which may impact how future support calls get matched to support agents).

Note, embodiments of the disclosure are described herein using an online tax-preparation service as an example of computer software, software interfaces, etc., that may match support agents to users interacting with the tax-preparation service based on emotional states of support agents. One of ordinary skill in the art will recognize that the approaches for matching support agents to users based on emotional states of support agents may be adapted for use by a broad variety of software applications, online or web services, software features, or support services provided using video chat where emotional states can be inferred based on visual cues (e.g., an online support service for assisting users with products purchased from a home improvement store).

FIG. 1 illustrates an example of a computing environment 100 used to provide an interactive computing service 140 with assisted support, according to one embodiment. As shown, the computing environment 100 includes user mobile devices 102A-M, agent mobile devices 130A-N, and an interactive computing service 140, which are each connected to a network 120. The network 120, in general, may be a wide area network (WAN), local area network (LAN), wireless LAN (WLAN), personal area network (PAN), a cellular network, etc. In a particular embodiment, the network 120 is the Internet.

Mobile devices 102 and 130 are included to be representative of a variety of computing devices, such as smartphones, tablets, portable gaming devices, and the like. As shown, mobile device 102A includes web camera 104, web browser 106 and application 108. Similarly, mobile device 130A includes web camera 132, web browser 134 and application 136. Mobile devices 102, 130 may be used to access the interactive computing service 140. For example, web browsers 106, 134 may be used to access the interactive computing service 140 by rendering web pages received from the interactive computing service 140.

Applications 108 and 136 are included to be representative of a component of a client server application (or other distributed application) which can communicate with the interactive computing service 140 over network 120. Applications 108, 136 may be "thin" clients where the processing is largely directed by the applications 108, 136, but performed by computing systems of the interactive computing service 140 or conventional software applications installed on mobile devices 102, 130.

In one embodiment, web browsers 106, 134, and applications 108, 136 communicate with the interactive computing service 140. For example, referring to mobile device 102, in the case where interactive computing service 140 offers a tax-preparation service, web browser 106 and application 108 may provide software which guides a user through preparing a tax return as well as provide the user with access to a variety of related features (e.g., such as an video-chat assisted support) from the interactive computing service 140. Referring to mobile device 130, web browser 134 and application 136 may provide software which allows a support agent to provide support or assist users with accomplishing a particular task. For example, a support agent can use web browser 134 and/or application 136 to access features or content of the interactive computing service 140 that may not be available to users in order to provide technical support to users. Such features, for example, may include detailed product documentation, access to user accounts for the online service, etc.

In one embodiment, a user and a support agent can interact via a video chat session. For example, a user can interact with a support agent (via application 108 and web camera 104) in a video chat to receive assistance filing a prepared return, ask questions about the service, or receive other help related to features and content provided by the online service. Likewise, the support agent can interact with a user via a video chat session during a support call. During a video support call, the user may be visible to the support agent on an interface of the support agent's mobile device 130. Likewise, during the video support call, the support agent may be visible to the user on an interface of the user's mobile device 102.

As shown, the agent mobile device 130A also includes an emotion recognition component 110, which is configured to monitor visual cues of a support agent to infer the support agent's emotional responses to a user during an agent-to-user video support call. For example, the emotion recognition component 110 can evaluate facial attributes or visual cues of the user for the duration of the video call and generate emotion recognition data that describes the agent's emotions over the course of the video call. In some embodiments, the emotion recognition data can include the facial recognition (visual cue) data corresponding to different locations (e.g., x-y coordinates, in a two-dimensional coordinate system) of the support agent at different times of the call. Such facial recognition data may indicate particular facial attributes such as whether the support agent has a raised eye brow, lip curl, nose wrinkle, and other visual cues that may indicate an emotional state for the support agent. In some embodiments, the emotion recognition data may also include an aggregate set of confidence scores for a set of emotions (e.g., happiness, frustration, anger, sadness, contempt, etc.) determined from the facial recognition data at the different sample times. For example, assuming a support agent interacted with a user via video chat for two minutes, the emotion recognition data can include facial recognition data that was sampled from the agent every fifteen seconds (or some other sample period). Further, the emotion recognition data may indicate a confidence of 90% happiness, 10% sadness at the first sample period, 95% happiness, 5% sadness at the second sample period, and so on. In some cases, the emotion recognition data can indicate a percentage of time of the duration of the video call that the user expressed a given emotion (e.g., 95% of the time the user was happy, 5% of the time the user was nervous).

As shown, the interactive computing service 140 includes a service front-end 142, an application server 144, storage 150, and support component 152. In this example, the interactive computing service 140 is generally modeled as a web server (i.e., service front-end 142), an application server 144, and a database (i.e., storage 150). Of course, other software architectures or distributed application frameworks could be used. Service front-end 142 and application server 144 are included to be representative of physical computing systems, as well as representative of virtual machine instances deployed to a computing cloud. Service front-end 142 may communicate with application server 144 to respond to requests from applications on mobile devices 102 and 130.

The application server 144 includes an application component 146 and feedback component 148. Continuing with the example of a tax preparation service, the application component 146 may provide one or more software applications which are used to guide a user in preparing a tax return and to access related features and services, e.g., to interact with support component 152. In one embodiment, the application component 146 may respond to requests from users and/or support agents by generating hypertext markup language (HTML) and related content passed to a user and rendered as a user interface (e.g., forms, text fields, and so on, along with scripts or applets executed by a web browser). In some cases, the application 108 running on mobile device 102 and/or application 136 running on mobile device 130 can generate user interface content to present data retrieved from the application server 144. In general, the application component 146 may be implemented using any suitable software programming language, application framework, web service solution stack, virtual application containers, etc., in order to present application features and content to a user.

In some embodiments, the application server 144 may include one or more graphical user interface (GUI) components that interactive computing service 140 can present on mobile devices 102, 130 based on whether a user is interacting with a workflow (via application component 146), providing feedback for information content (e.g., via feedback component 148), etc. The GUI components may include, for example, HTML components or code that generates HTML components that can be passed to mobile devices 102, 130 and rendered as a user interface. The GUI components may additionally include instructions executable by client systems or mobile devices to display a user interface. The GUI components may additionally include instructions executable by mobile devices 102, 130 to display a user interface using language-specific or operating system-specific GUI components (e.g., instructions for displaying Win32 forms or similar components on other operating system platforms, Abstract Window Toolkit or Swing API components on the Java platform, and so on). Generally, instructions capable of rendering a GUI on mobile devices 102, 130 may include computer executable code generated from compiling and/or interpreting C (or variants thereof), Java, PHP, Ruby, HTML, JavaScript, Python, AJAX, VBscript, and other programming or scripting languages used to compose and present a GUI. In an example tax preparation application, application server 144 components may include screens for prompting a user for personal information (e.g., name, address, social security number, marital status, gender), income information (from W-2s, 1099s, K-1s, and so on), various deductions and credits that the user may qualify for, feedback characterizing the user's experience, etc.

The feedback component 148 may be used to capture feedback regarding user experience. For example, a user interacting with the online service may at times be prompted to provide feedback regarding the usefulness of certain features and/or content provided by the online service. Such feedback may be provided in the form of user comments, up or down votes, star ratings, or in any other form that indicates whether the user was satisfied or dissatisfied with the online service. As described below, if the user provides user comments, the feedback component 148 and/or matching component 156 may evaluate such feedback using natural language processing techniques to identify an emotional state of the user. In one example, if a user is having trouble locating a particular feature, the user may provide a comment that indicates the user is frustrated (e.g., "I have spent way too much time trying to find the tax return updating tool").

The support component 152 may allow users to interact with support agents in order to receive assistance in accomplishing a particular task. Continuing with the above tax preparation example, such assistance can include help with using the service to submit a completed tax return to the IRS, locating particular tax-related features from the service, answering questions related to where to find information on the requirements for qualifying for a tax credit, etc. In particular, the support component 152 is configured to determine emotion profiles for support agents and match support agents with users based in part on the emotion profiles.

For example, the support component 152 includes a validation component 154, matching component 156, and monitoring component 158. In one embodiment, the validation component 154 is configured to generate emotion profiles for support agents. For example, as described below, the validation component 154 can receive emotion recognition data from one or more support agents (e.g., via the emotion recognition components 110 from each of the support agents' mobile devices), any feedback received from users indicating the quality of their experience with the support agents for the video calls, and metadata associated with the video support calls. The validation component 154 can evaluate the received information and identify which emotional states of the support agents have a greater likelihood of increasing positive outcomes for video support calls. The validation component 154 can generally employ any machine learning algorithm or technique to evaluate the received information. Further, when evaluating the received information to determine the emotional states that correlate with positive outcomes, the validation component 154 can control for other support agent criteria, such as agent skill, experience, support topic, etc. Controlling for other criteria that may affect the outcome of a call may allow the validation component 154 to determine whether an emotional state has an impact on an outcome of a support call. Put differently, controlling for one or more other factors, the validation component 154 may determine that a support agent with emotional state A has better outcomes (e.g., reduced call times, positive user feedback, etc.) for video support calls compared to a support agent with emotional state B, relative to questions about a particular topic. The emotion profile generated for each support agent may indicate how the support agent generally responds to users (based on the given topic, emotional state of the user, etc.) during support calls. As described below, based on the emotion profiles for the support agents, the support component 152 can determine the emotional responses to particular topics, user emotional states, and other characteristics related to the user and support call that tend to increase positive outcomes.

The matching component 156 is configured to assign support agents to users based, in part, on emotion profiles of the support agents (received from the validation component 154). For example, as described below, the matching component 156 may use the emotion profiles of the support agents in addition to other criteria (e.g., agent availability, agent experience, support queue, etc.) to assign support agents to users.

For example, assume a user interacting with an online tax preparation service is having trouble updating a previous year's tax return, and uses a video chat support feature to request assistance from a support agent. When the matching component 156 receives a request, the matching component 156 may also receive metadata associated with the support call, feedback from the user received prior to the user submitting the request, etc. Continuing with this example, the matching component 156 may determine that the user is married (e.g., based on the metadata) and that the user is upset (e.g., based on evaluating the feedback).

Further, assume there are three support agents A, B and C. In such an example, rather than match the user to one of support agents A, B or C based solely on the availability of support agents A-C, expertise of agents A-C, and/or support queue for agents A-C, the matching component 156 can also consider each agent A-C's record (or history) of handling emotion (e.g., based on their emotion profiles). For example, the emotion profiles for agents A-C may indicate agent A is "cheerful," agent B is "generous," and agent C is "stern." At the same time, the matching component 156 may have determined from the emotion profiles that users calling about tax filing extensions are handled better by agents that are stern. As a result, the matching component 156 may match the user to agent C whose emotion profile indicates is stern. In this manner, the matching component 156 can match any given user to the support agent that has the optimal emotional response to that type of user (e.g., which may be expressing a particular emotion). In general, however, the emotion profile for a support agent can indicate a history of the agent's average emotional responses to any characteristic associated with a user or topic of video support call request.

The monitoring component 158 may be used to monitor support agents' emotional states and adjust (or update) the emotion profiles for the support agents. For example, the monitoring component 158 can monitor support agents' emotional states regardless of whether the support agents are interacting with a user. Monitoring support agents in real-time allows the monitoring component 158 to determine whether any given agent is expressing an emotional state that deviates from their emotion profile (e.g., is different from the agent's expected emotional state). For example, assume the monitoring component 158 determines that agent A is expressing "resentment," but their emotion profile indicates that they are normally "cheerful" (and the online services uses "cheerful" in selecting certain calls to assign to agents). In such a case, the monitoring component 158 can alert agent A (e.g., during the support call handled by agent A) that they are expressing an emotion that deviates from their typical emotion profile. In some cases (e.g., if agent A continues to express the different emotional state), the monitoring component 158 can update the emotion profile for agent A to reflect the current emotional state. Doing so may impact subsequent matching to agent A (e.g., a user that may previously have been matched to agent A, may now be matched to another agent).

Note that the example emotions described herein are provided merely as reference examples of the different emotional states that can be inferred based on visual cues in a video stream and accounted for when matching support agents to users. Those of ordinary skill in the art, however, will recognize that in general the techniques presented herein can be adapted to account for any type of emotion.

Figure 2:
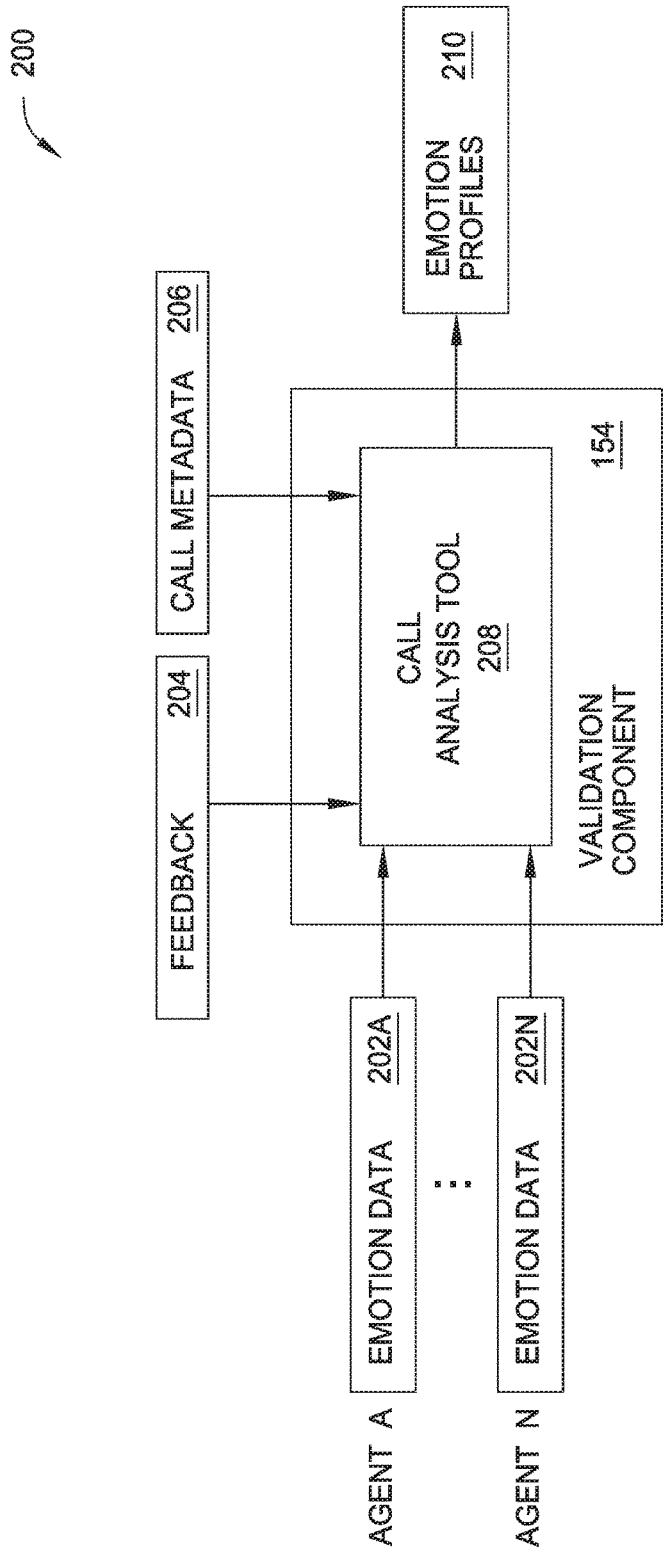
FIG. 2 illustrates components of the interactive computing service used to determine emotion profiles of support agents, according to one embodiment.

FIG. 2 further illustrates the validation component 154 described relative to FIG. 1, according to one embodiment. As shown, the validation component 154 includes call analysis tool 208, which is configured to generate emotion profiles 210 for support agents. For example, the call analysis tool 208 is configured to receive emotion data 202A-202N from (the emotion recognition components 110 of) the agent mobile devices 130A-N. As noted, such emotion data 202 may include facial recognition data (e.g., biometric data) sampled at different locations of the support agent at different times during the call, an aggregate set confidence scores for a set of emotions corresponding to the facial recognition data, etc.

In one embodiment, the call analysis tool 208 receives metadata 206 describing details (e.g., such as the reason for the support call, personal user details, such as age, marital status, gender, location, etc., and other information) associated with one or more support calls. In one embodiment, the call analysis tool 208 can also receive feedback 204 from one or more users. For example, as noted, such feedback 204 may indicate an outcome of the support call (e.g., users were satisfied or dissatisfied with the support agent, the online service, etc.). In some cases, the feedback 204 may indicate emotional states of the users (e.g., user comments within the feedback 204 can indicate whether users are frustrated, angry, happy, etc.).

In one embodiment, the call analysis tool 208 evaluates the emotion data 202A-N, feedback 204 and/or call metadata 206 to generate emotion profiles 210 for support agents. As noted, the call analysis tool 208 can employ machine learning techniques to evaluate the emotion data 202A-N, feedback 204 and/or call metadata 206, and identify which emotional states correlate with positive outcomes of support calls. For example, in one embodiment, the call analysis tool 208 can determine using machine learning techniques whether a given emotional response from agent A provided a better outcome than an emotional response from agent B with a similar problem and similar user. Of course, those of ordinary skill in the art will recognize that other metrics for evaluating correlations between the received data can be used. The call analysis tool 208 can determine whether a support call has a positive outcome based on a duration of the call, feedback from the user describing their experience with the call, and other criteria.

In one embodiment, the emotion profiles 210 generated for the support agents may indicate, for each agent, the emotional state the support agent generally expresses in response to different types of users and situations. In one reference example, for agent B, the emotion profile 210 may indicate that agent B expresses "resentment" in response to a first type of users, "happiness" in response to a second type of users, and so on. In addition to types of users, the emotion profiles 210 may indicate each support agent's emotional response when confronted with different types of topics (e.g., user A is "happy" when answering product related questions about the tax preparation service, user A is "bored" when answering questions related to how to file a tax-return, etc.). In this manner, the support component 152 can evaluate the emotion profiles 210 to identify which emotional states (in response to different situations) produce optical support call outcomes.

Figure 3B:
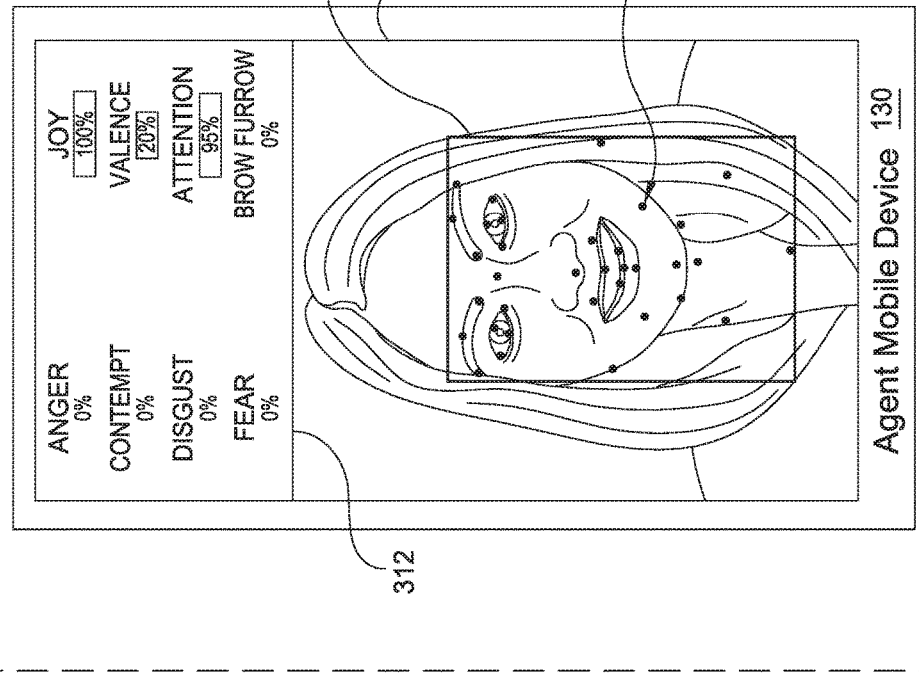
FIG. 3B illustrates an example web camera view of a support agent interacting with a user, according to one embodiment.
Figure 3A:
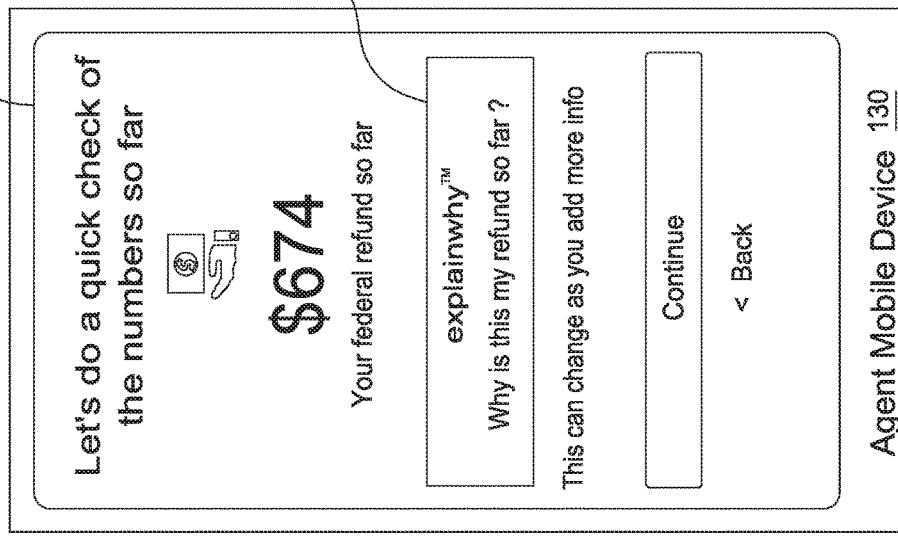
FIG. 3A illustrates an example interface visible to a support agent on the agent's mobile device, according to one embodiment.

FIG. 3A shows an interface 302 that may be visible on a display on the agent mobile device 130, according to one embodiment. In this example, a support agent is interacting with a user (via video chat) to help the user prepare a tax return with the online tax preparation service. As shown, in this embodiment, the user is not visible to the support agent via the interface 302. However, in other embodiments, the interface 302 can show the user to the support agent during a video support call.

During the support call, the interface 302 shows the amount of tax refund "$674" determined so far for the user by the tax preparation service. The interface 302 also includes an "explainwhy" box 304 to prompt the support agent to explain why the tax preparation service has determined a tax refund of "$674" for the user. The suggestions within the "explainwhy" box 304 may change as the agent interacts with the user during the support call. Note, however, that the example interface 302 illustrates merely one example of an interface that may be visible to a support agent, and that other types of interfaces as well as different types of content may be visible to agents in different situations.

FIG. 3B shows an example view 306 of the support agent that is interacting with the user to prepare a tax return. View 306, for example, represents the view of the support agent from the perspective of the web camera 132 on the agent mobile device 130. The emotion recognition component 110, for example, on the agent mobile device 130 may interact with the web camera 132 to capture facial recognition data and compute confidence scores across a set of emotions for the support agent during the video call.

For example, as shown, the emotion recognition component 110 can measure facial attributes (or visual cues) of the support agent at different locations 308 within a measurement area 310. In this example, based on the measurements at locations 308, the emotion recognition component 110 returns a confidence of 0% for "anger," 0% for "contempt," 0% for "fear," and 100% for "joy." Additionally, the emotion recognition component 110 can determine a measure of attentiveness (e.g., 95% attentive), a valence (e.g., 20%) and measure of brow furrow (e.g., 0%) of the support agent. Once determined, the emotion recognition component 110 may send the emotion data to the support component 152 and/or to storage 150 within the computing service 140.

Note, however, that the emotions and facial attributes depicted in FIG. 3B are provided merely as reference examples of the type of emotions and facial attributes that may be determined using the emotion recognition component 110. More generally, those of ordinary skill in the art will recognize that other types of emotions and facial attributes may be determined for different facial features.

Figure 4:
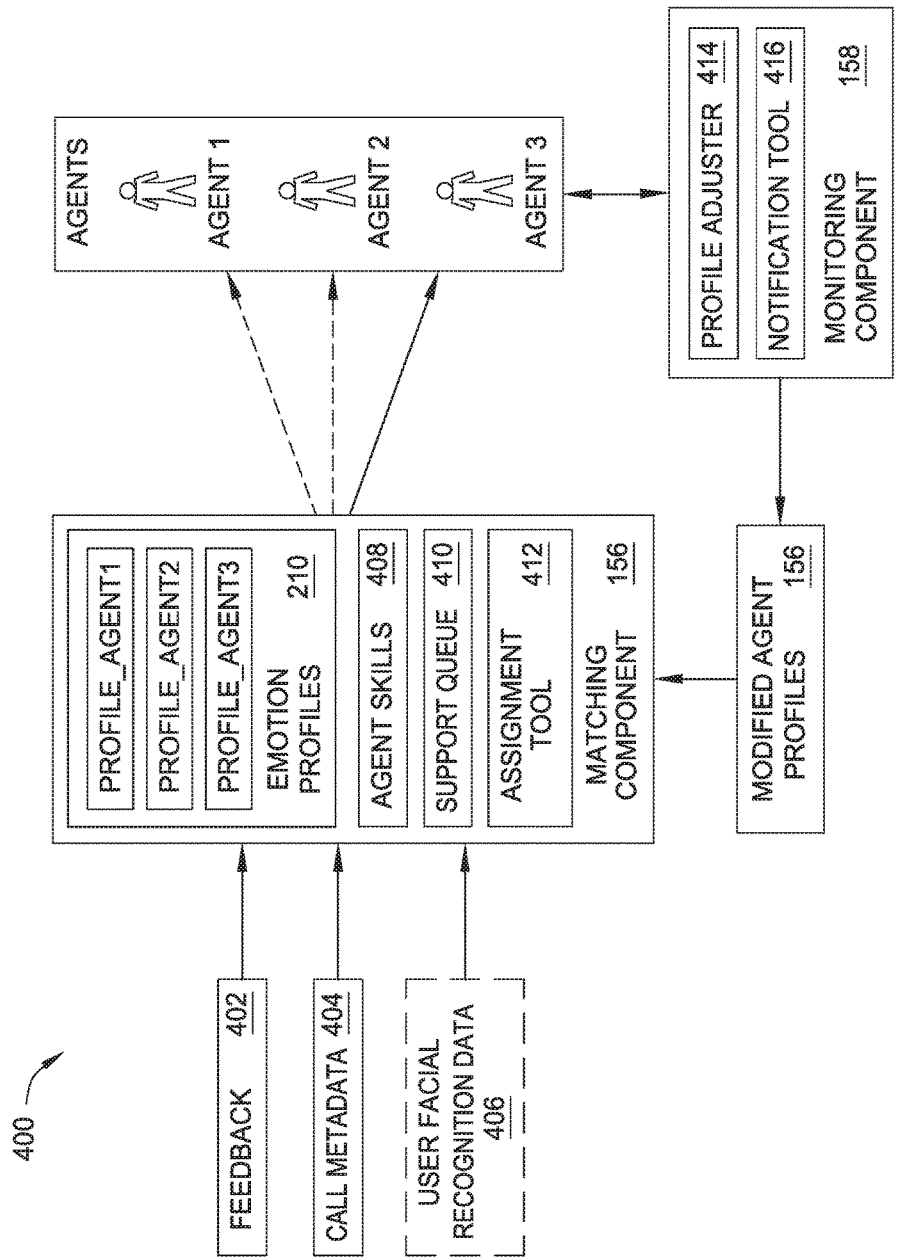
FIG. 4 illustrates components of the interactive computing service used to match support agents with users interacting with the interactive computing service, according to one embodiment.

FIG. 4 further illustrates the matching component 156 and monitoring component 158 described relative to FIG. 1, according to one embodiment. As shown, the matching component 156 includes an assignment tool 412 and information, such as emotion profiles 210, agent skills 408, support queue 410, etc., that the assignment tool 412 may use to match (or assign) support agents to users that want to interact via video chat with a support agent. For any given request to interact with a support agent, the matching component 156 may receive feedback 402, call metadata 404 and/or user facial recognition data 406 with the request.

The matching component 156 may use feedback 402 to determine an emotional state of the user. For example, before placing the video support call, the user may have provided feedback (e.g., such as user comments, up or down votes, yes or no to particular questions, etc.) regarding their experience in interacting with the online service. Such feedback may indicate a particular emotional state of the user, such as whether the user is "frustrated," "angry," etc. In the case of user comments, the matching component 156 can evaluate the comments using natural language processing techniques.

In some cases, the matching component 156 can predict an emotional state of the user placing the call based on user facial recognition data 406. For example, in some cases, user mobile devices 102 may be configured with an emotion recognition component that is configured to monitor the user while the user interacts with the online service 140 and determine the user's emotional state. In some cases, the online service 140 may request, from the user, permission to interact with the user's camera 104 and emotion recognition software before receiving emotion data from the mobile device 102. In one embodiment, the emotion recognition software may monitor and update the emotional state of the user, in real-time, as the user interacts with the online service 140. In the event the user decides to send a request to interact with a support agent via video, the matching component 156 can receive the latest collected user facial recognition data 406 in addition to the call metadata 404 and feedback 402 in the request.

As shown in this example, three support agents 1-3 are available to interact with users. In one embodiment, the assignment tool 412 matches a user to one of the support agents 1-3 based, in part, on emotion profiles 210 and one or more representative data points characterizing the user and the support request. Such representative data points can include information such as the emotional state of the user, reason for the call (e.g., support topic), personal information of the user, etc. For example, the assignment tool 412 may infer that the user placing the call is "irritated" (e.g., based on feedback 402 and/or user facial recognition data 406) and is having trouble using the service to file a tax return (e.g., based on call metadata). Based on emotion profiles 210 determined for the agents, the assignment tool 412 can determine that agents that express "empathy" in response to "irritated" users have the best call outcomes. Thus, in this example, since "profile_agent1" indicates that agent 1 expresses "frustration" in response to "irritated" users, "profile_agent2" indicates that agent 2 expresses "calmness" in response to "irritated" users, and "profile_agent3" indicates that agent 3 expresses "empathy" in response to "irritated" users, the assignment tool 412 matches the user to agent 3. Although, in this example, the optimal emotional response was determined with respect to an emotional state of the user, in general, however, the matching component 156 can determine the optimal emotional response with respect to one or more various types of criteria (e.g., such as emotional state of the user, the type of issue, marital status of the user, location of the user, etc.).

In some embodiments, the assignment tool 412 can also consider (e.g., in addition to emotion profiles 210) agent skills 408, support queue 410, availability of agents 1-3, etc., when matching the user to one of the agents 1-3. Continuing with the above example, assume the assignment tool 412 determines that agents 1 and 3 have several users waiting in their respective support queues, while agent 2 has relatively few users waiting in its support queue. In these cases, the assignment tool 412 may determine to assign the user to support agent 2, even though agent 2's emotion of "calmness" in response to "irritated" users may not result in an optimal call outcome. The assignment tool 412 may do so in order to avoid the user having to wait a long period of time before receiving assistance. In some embodiments, the assignment tool 412 may set a threshold for each of the support queues to determine whether to assign users to the support agent associated with a particular support queue. For example, if the number of users in the support queue or an estimated wait time for the support queue is above the threshold, the assignment tool 412 can assign the user to a different agent. In general, however, the assignment tool 412 can adjust assignments of users to support agents (e.g., in the same or similar manner) based on other criteria such as agent skills, agent experience, nature of the problem, etc.

In one embodiment, the matching component 156 can interact with the monitoring component 158 to adjust agent emotion profiles 210 in real-time and/or notify support agents that they are expressing emotions that deviate from their emotion profiles. For example, as shown, the monitoring component 158 includes a profile adjuster 414 and notification tool 416. In this example, the profile adjuster 414 can be used to monitor support agents 1-3's emotional states in real-time. The profile adjuster 414 can monitor the agents 1-3 emotional states whether or not the agents are interacting with users during a video support call. Continuing with the above example, assume that the profile adjuster 414 determines that, during the call with the irritated user, agent 3 begins expressing a different emotion (e.g., frustration) in response to the "irritated" user. Once determined, the monitoring component 158 can use notification tool 416 to notify agent 3 that they are expressing an emotion that may negatively impact the call outcome. Additionally, or alternatively, the monitoring component 158 can use the profile adjuster to update "profile_Agent3" with a modified agent profile 418. The modified agent profile 418 may reduce the likelihood that the matching component matches a subsequent "irritated" user to agent 3. The monitoring component 158 may send a modified agent profile 418, for example, in cases where agent 3 does not adjust their emotional state in response to the notification.

In this manner, the techniques presented herein can be used by an online service to determine, in real-time, emotional states of users and support agents, and match users to support agents based on the determined emotional states. Further, the techniques presented herein allow an online service to continually monitor and update emotion profiles of agents to impact future matching decisions.

Figure 5:
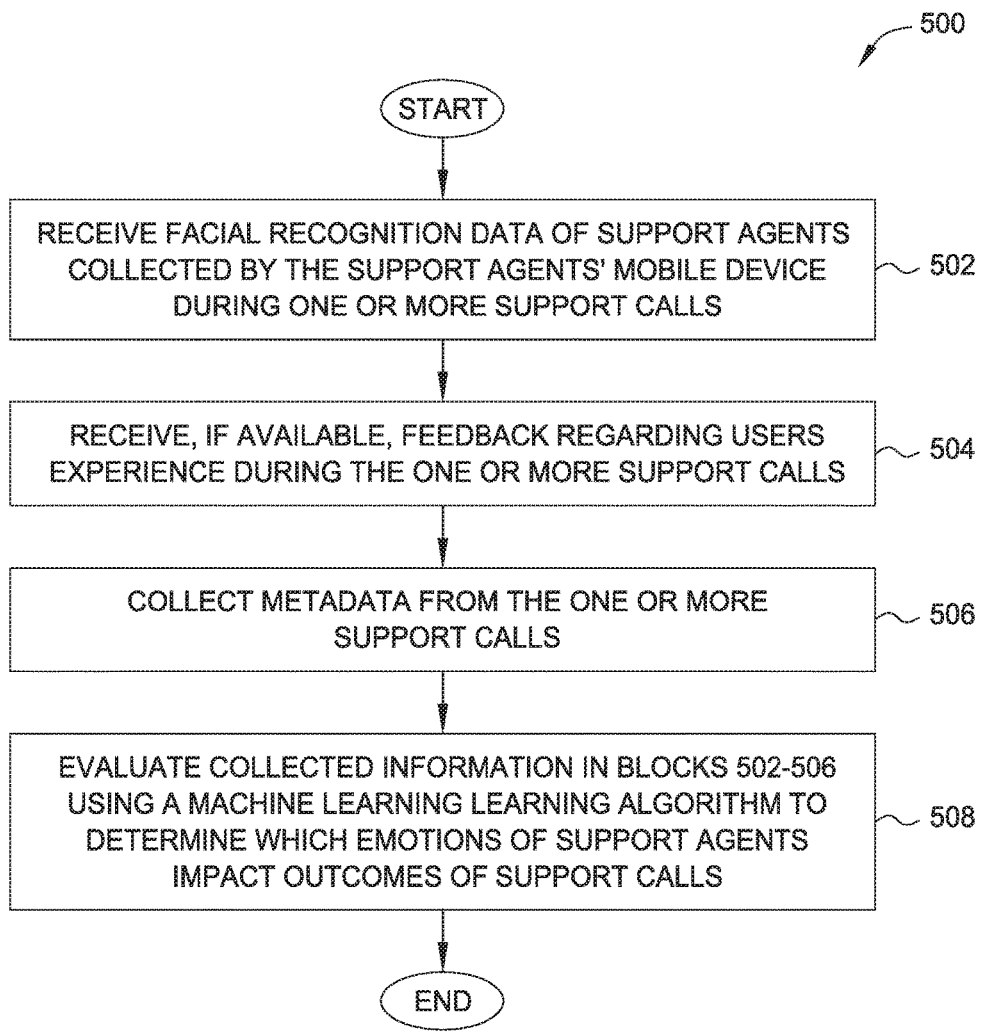
FIG. 5 illustrates a method for determining emotional states that impact call outcomes, according to one embodiment.

FIG. 5 illustrates a method 500 for generating a model to determine one or more emotional states that impact call outcomes, according to one embodiment. As shown, the method 500 begins at step 502, where the application (e.g., an online tax-preparation service) receives facial recognition (or biometric) data of support agents collected by each agent's respective mobile device during one or more video support calls. For example, as noted above, each agent's mobile device may include an emotion recognition component (e.g., facial recognition software), which interacts with the web camera on the agent's mobile device to evaluate visual cues of the support agent and infer an emotional state of the agent (e.g., based on the visual cues).

At 504, the application can receive, if available, feedback from the users regarding their experience and interaction with the support agents during the video support calls. For example, such feedback can indicate whether the support agent resolved the user's particular problem, whether the agent communicated effectively, the agent's demeanor, a measure of the user's satisfaction with the call (e.g., Excellent, Average, Below Average, etc.), and other information regarding the outcome of the call. At 506, the application collects metadata associated with the video support calls. Such metadata can information describing the reason for the calls, details of the users (e.g., age, marital status, location, gender, etc.), and the like.

At 508, the application evaluates the collected information (e.g., the facial recognition data, user feedback, and metadata) from each of the video support calls. For example, in one embodiment, the application can use a machine learning algorithm to correlate the emotional responses of the support agents during the video calls with the outcomes of the video calls and determine which emotional responses of support agents (to particular types of users, issues, etc.) produced the best outcomes. In one embodiment, the application can evaluate (e.g., using the machine learning algorithm) the calls from each support agent to determine how each support agent reacts emotionally to different types of users, issues, etc. Based on the information, the application can generate emotion profiles for each support agent. In this manner, the application can identify which emotional responses produce better outcomes for agent-to-user interactions and use the information as an additional criteria when matching (or assigning) support agents to users.

Figure 6:
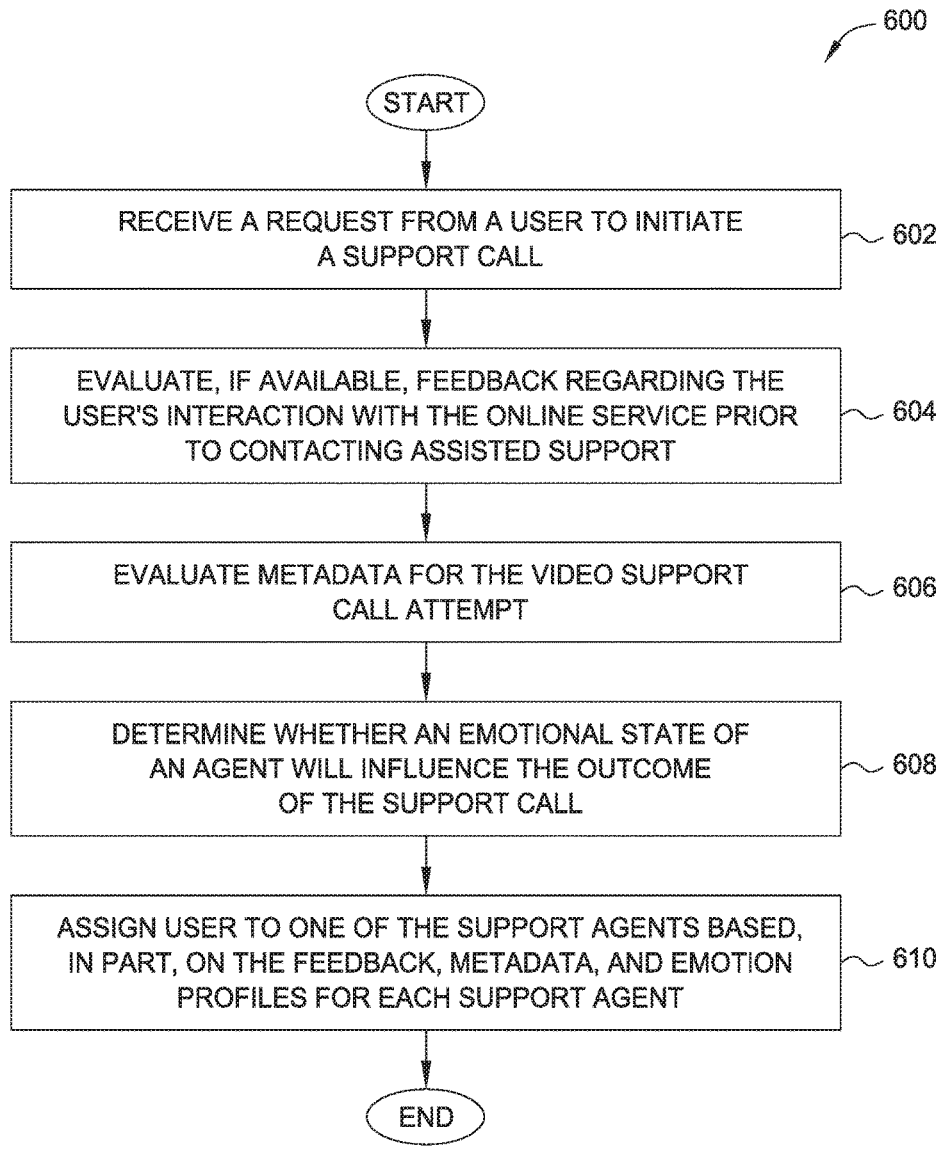
FIG. 6 illustrates a method for assigning a support agent to a user in real-time based on emotion profiles of support agents, according to one embodiment.

FIG. 6 illustrates a method 600 for assigning a support agent to a user in real time based on emotion profiles of support agents, according to one embodiment. As shown, the method 600 begins at step 602, where the application (e.g., an online tax-preparation service) receives a request to initiate a support call. For example, the request can be to access a video support service hosted by the application. At 604, the application evaluates, if available, feedback regarding the user's interaction with the application prior to the user contacting assisted support. At 606, the application evaluates metadata describing details associated with the video support call.

The application may determine one or more characteristics of the user and the request based, in part, on the feedback and the metadata. Using an on-line tax preparation service as a reference example for an application, the user may have provided feedback regarding searching for deadlines for requesting an extension to file a tax return. In one case, the on-line tax preparation service can infer an emotional state of the user (e.g., such as whether the user was "frustrated," "angry," etc.) based on user comments in the feedback. At the same time, the online-tax preparation service can determine the reason for the call, the age of the user, how long the user has been interacting with the online service, marital status of the user, etc. based on the metadata associated with the video support call attempt. The online service, for example, may have prompted the user for such details prior to the user contacting assisted support (e.g., in order to select appropriate content to display to the user for the user's tax preparation).

At 608, the application determines whether an emotional state of an agent (e.g., that will be assigned to process the call) will influence the outcome of the call. For example, as noted, the application can evaluate the emotion profiles of the support agents to determine which emotional states correlate with positive outcomes of support calls. At 610, the application assigns the user to one of the support agents based, in part, on the feedback, metadata, and emotion profiles for each support agent. That is, in some cases, the application can evaluate the emotion profiles of the support agents to identify which agent has the ability and/or record of responding in an emotionally optimal way to the type of user currently waiting to receive assistance in order to increase the chances for achieving a successful outcome of the call. Accounting for how agents respond emotionally to different types of users and issues when matching agents to customers can improve the outcome for support calls, and thereby improve the overall customer service provided to users of the online service.

Figure 7:
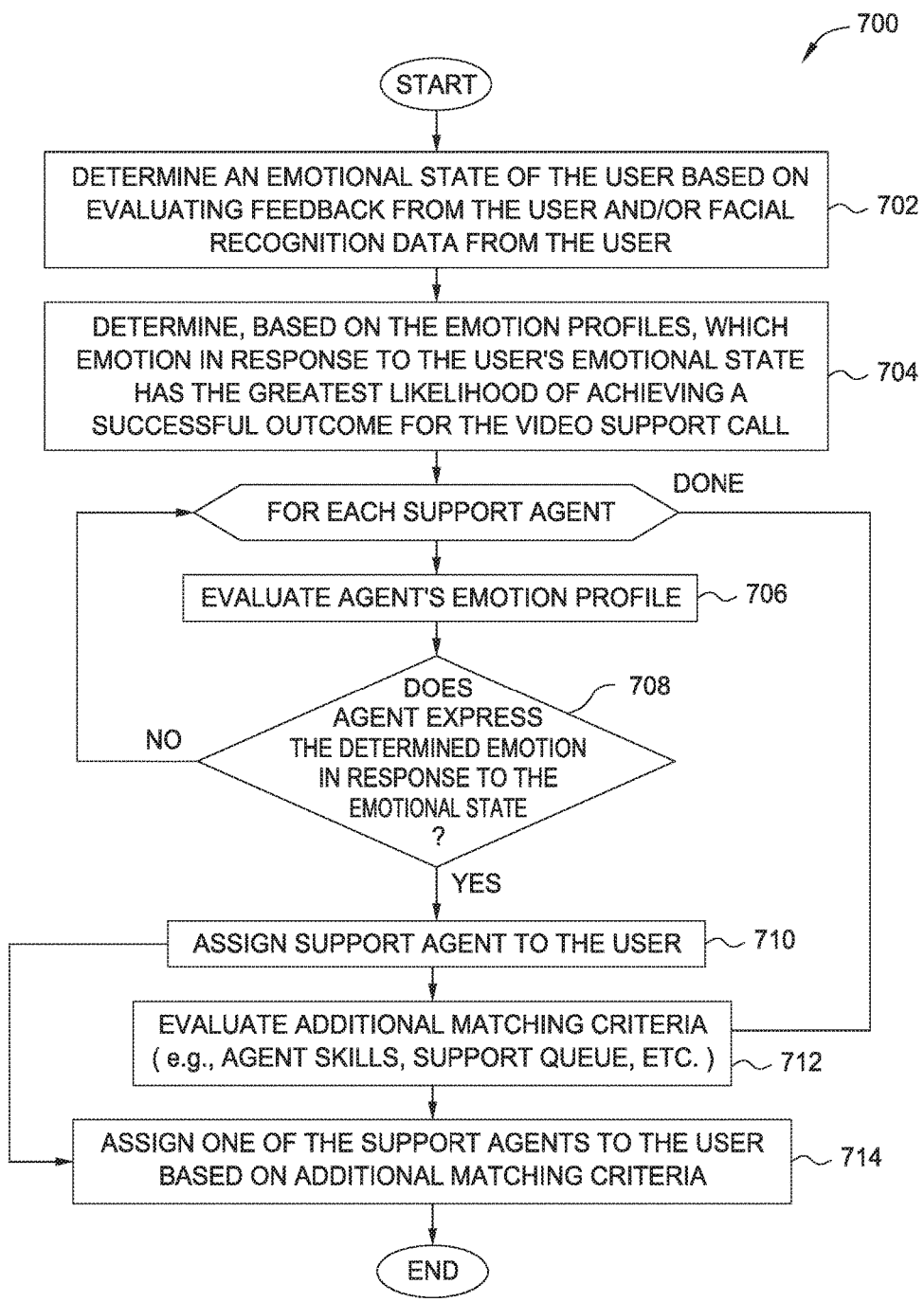
FIG. 7 illustrates a method for evaluating emotion profiles of support agents, according to one embodiment.

FIG. 7 illustrates a method 700 for evaluating emotion profiles of support agents to determine which agent's emotional response will increase the chances for a successful video support call outcome, according to one embodiment. As shown, the method 700 begins at step 702, where the application (e.g., an online tax-preparation service) determines an emotional state of the user based on evaluating feedback received from the user and/or facial recognition data received from the user. For example, as noted above, in some cases, the user may opt-in to sharing facial recognition data with the application. In the event the user requests to interact with a support agent via video chat, the application can receive the facial recognition data and determine, based on the facial recognition data, an emotional state of the user. Additionally or alternatively, as also noted above, the application can infer an emotional state of the user from feedback received from the user prior to the user submitting a request to interact with a support agent.

At 704, the application determines, based on emotion profiles of the support agents, which emotion in response to the user's emotional state has the greatest likelihood of achieving a successful (or positive) outcome for the video support call. Referring to one reference example, if the application determines that the user attempting to interact with a support agent is currently "angry," the application may determine that "angry" users are handled best by "stern" support agents (e.g., as opposed to "cheerful" support agents).

Once the emotional state of the user and optimal agent emotional response is determined, the application, for each support agent, evaluates the agent's emotion profile (step 706). The application then determines if the agent's emotion profile indicates that the agent is capable and/or has a history of expressing the optimal emotional response (step 708). If so, the application assigns the support agent as the optimal agent to assist the user in the video support call (step 710). In some embodiments, the application can also evaluate additional matching criteria (e.g., such as a support queue, agent skills, etc.) in addition to an agent's emotion profile when assigning an agent to a user. For example, as noted above, in some cases, the agent that is determined by the application to have the best emotional response may have several users in its support queue and may not be able to assist the current user in within a certain call wait threshold. In another example, the determined support agent may not have the expertise to resolve the user's particular problem. In yet another example, the emotional profile for the support agent may indicate that the support agent does not respond in an emotionally appropriate way to types of issues the user is calling about (e.g., the agent may express boredom when dealing with questions related to tax filing extensions). In such situations, the application can modify which support agent is selected to assist the user (e.g., the application may select the support agent that has the second best emotional response, and so on).

If, at 708, the application determines the support agent does not express the optimal emotional response, the application proceeds to perform steps 706 and 708 for the next support agent. In cases where the application is unable to find a support agent that expresses the optimal emotional response, the application, at 712, evaluates other matching criteria, and assigns, at 714, one of the support agents to the user based on the other matching criteria. For example, the application can assign the user to the support agent that has the shortest average call times, best user feedback, or some other criteria. In this manner, the application can account, in real-time, for the emotions of support agents and users when matching a given user to a support agent (e.g., in order to increase the chances of achieving a positive support call outcome).

Figure 8:
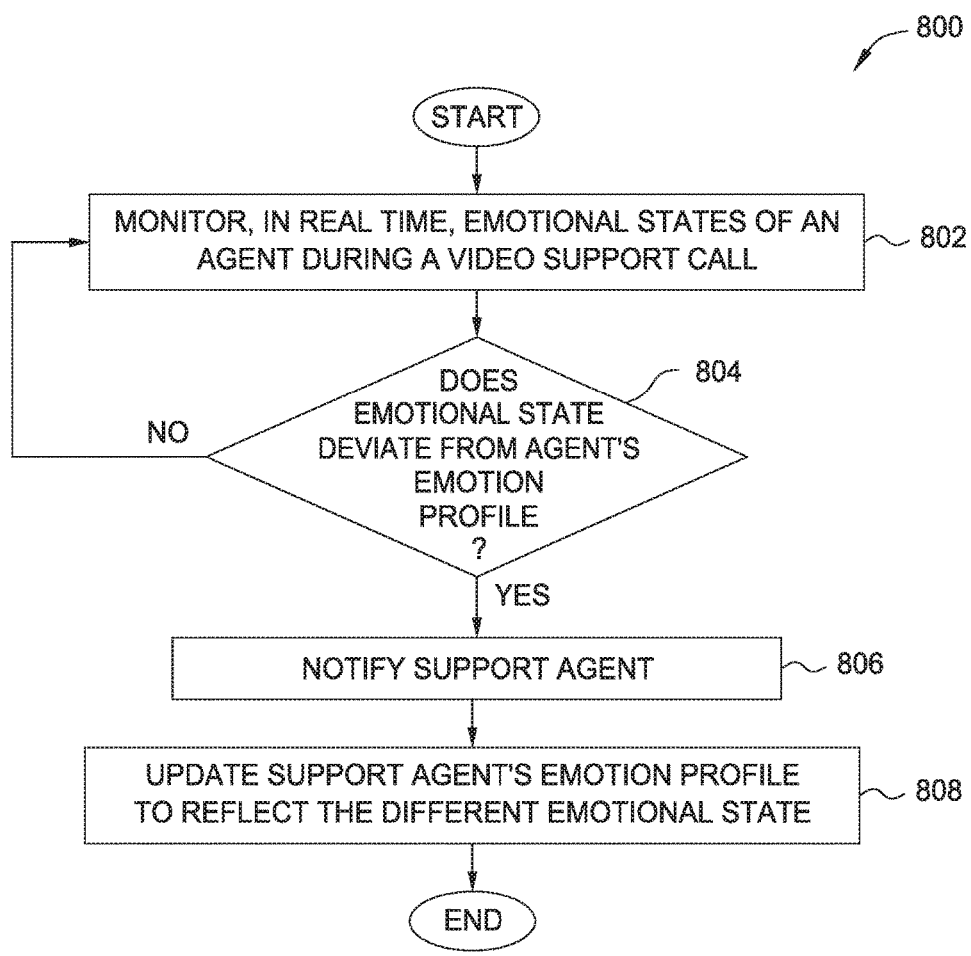
FIG. 8 illustrates a method for updating a support agent's emotion profile, according to one embodiment.

FIG. 8 illustrates a method 800 for updating a support agent's emotion profile based on monitoring the support agent's emotional state in real time, according to one embodiment. As shown, the method 800 begins at step 802, where the application (e.g., an online tax-preparation service) monitors in real-time the emotional states that a support agent expresses during a video support call. In one embodiment, the application can monitor the support agent regardless of whether the support agent is currently assisting a user. In such cases, the support agent may have to opt-in to sharing facial recognition data with the application while they are not interacting with a user.

At 804, the application determines if the support agent is expressing emotions (e.g., in response to the user) that is different from the agent's expected emotional state (e.g., indicated in the support agent's emotion profile). If so, the application can notify the support agent (e.g., during the call) (step 806) that they are expressing emotions that may negatively affect the chances of achieving a positive call outcome. In some cases, the application may notify that support agent after a threshold amount of time has passed since the detection of the deviation. Put differently, if the support agent returns to expressing emotions in-line with their emotion profile within the threshold amount of time, the application may not send an alert or notification to the support agent. Doing so can reduce the amount of notifications (which, in some cases, may distract the support agent) that are sent to a support agent during their video support chat with a user.

At 808, the application may modify or update the support agent's emotion profile to reflect the different emotional state. The application may do so, for example, in cases where the agent expressed an abnormal emotion response to a user for a prolonged period of time, where the agent has changed how they react to different types of users or issues, etc. In this manner, the application can account for variations in support agent's emotions, which can vary over time (e.g., hour to hour, day to day, etc.).

Figure 9:
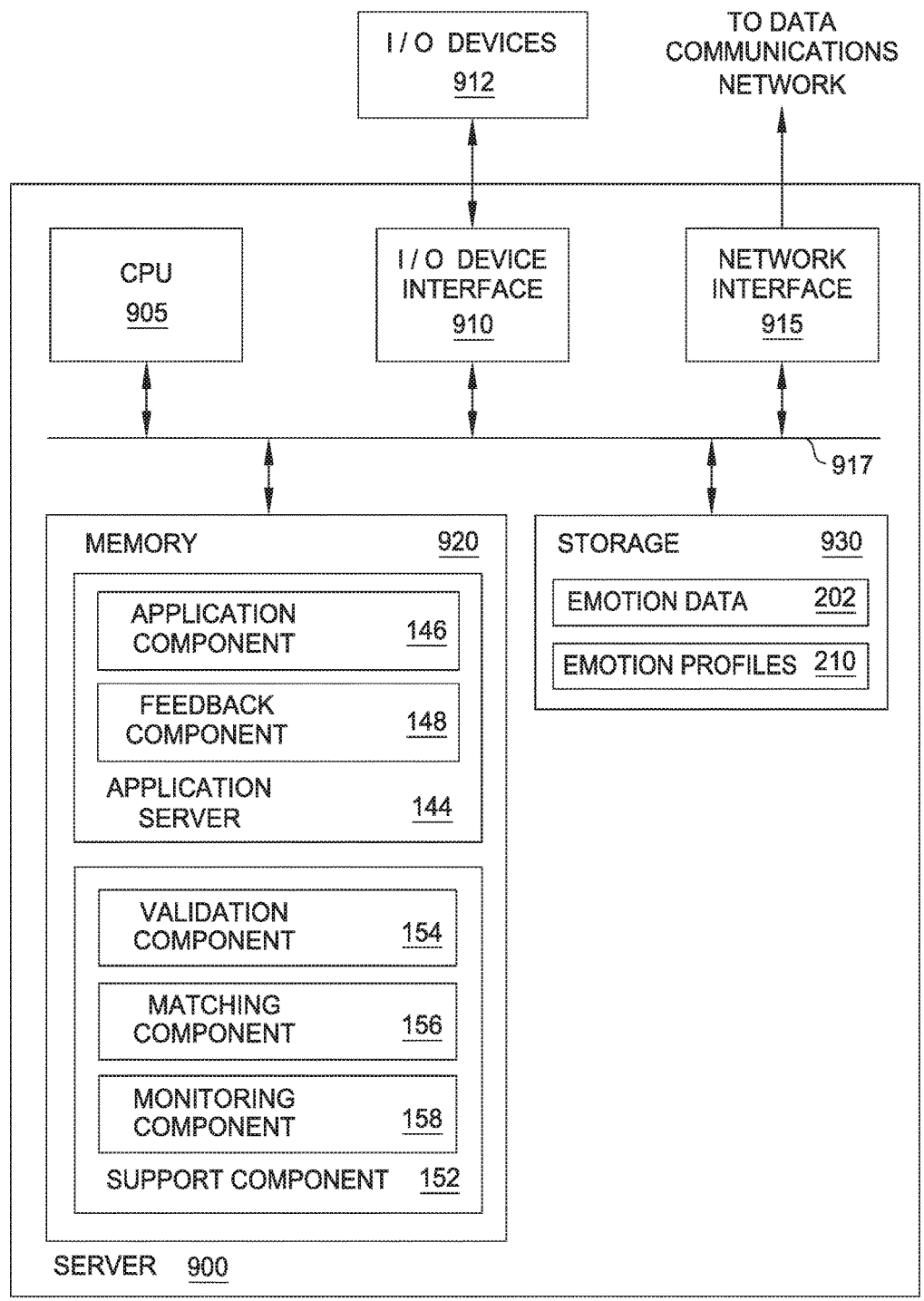
FIG. 9 illustrates an example computing system used to match support agents to users interacting with the interactive computing service, according to one embodiment.
Figure 7:
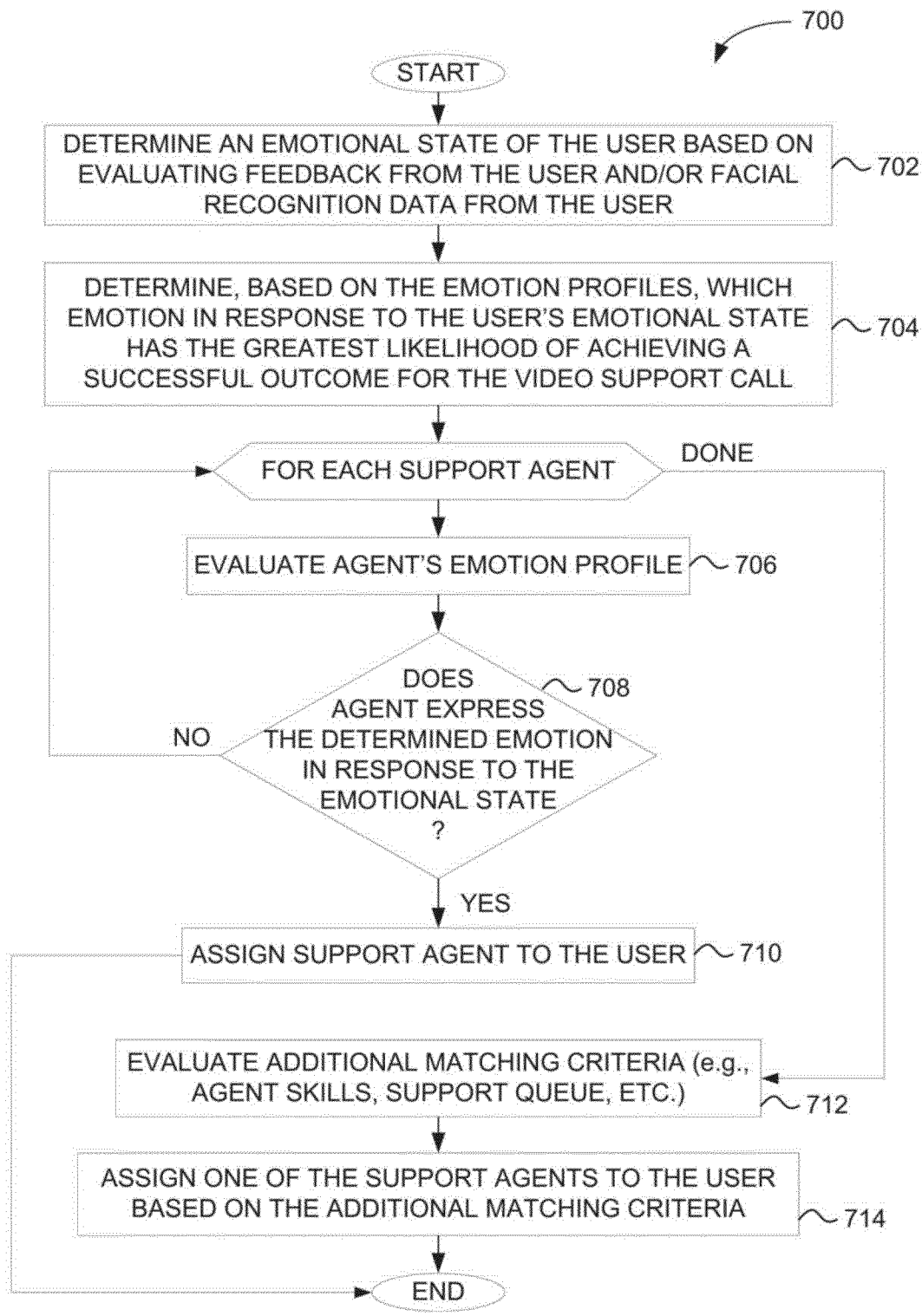

FIG. 9 illustrates an example computing system 900 used to determine emotion profiles for support agents and/or match support agents to customers in real-time based on emotions of support agents, according to one embodiment.

As shown, the computing system 900 includes, without limitation, a central processing unit (CPU) 905, a network interface 915, a memory 920, and storage 930, each connected to a bus 917. The computing system 900 may also include an I/O device interface 910 connecting I/O devices 912 (e.g., keyboard, display and mouse devices) to the computing system 900. Further, the computing elements shown in computing system 900 may correspond to a physical computing system (e.g., a system in a data center) or may be a virtual computing instance executing within a computing cloud.

The CPU 905 retrieves and executes programming instructions stored in the memory 920 as well as stored in the storage 930. The bus 917 is used to transmit programming instructions and application data between the CPU 905, I/O device interface 910, storage 930, network interface 915, and memory 920. Note, CPU 905 is included to be representative of a single CPU, multiple CPUs, a single CPU having multiple processing cores, and the like, and the memory 920 is generally included to be representative of a random access memory. The storage 930 may be a disk drive or flash storage device. Although shown as a single unit, the storage 930 may be a combination of fixed and/or removable storage devices, such as fixed disc drives, removable memory cards, optical storage, network attached storage (NAS), or a storage area-network (SAN).

Illustratively, the memory 920 includes an application server 144, which includes an application component 146 and a feedback component 148, and a support component 152, which includes a validation component 154, a matching component 156, and a monitoring component 158, all of which are discussed in greater detail above. Further, storage 930 includes emotion data 202 and emotion profiles 210 for support agents, both of which are also discussed in greater detail above.

Advantageously, the techniques presented herein allow an online service to evaluate support agent video calls to determine what emotion response (to different situations) works better to produce successful outcomes for agent-to-user interactions. Further, the techniques presented herein allow an online service to evaluate agent's to determine which agents are providing the right emotional response and match those agents to users waiting to receive assistance from the online service. Doing so improves the likelihood that the matched agent will achieve a successful call outcome and improves the user's experience with assisted support provided by the online service.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, any aspects, features, embodiments and advantages are included to be illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for matching a user of an application to a support agent, comprising:
    receiving facial recognition data of a user captured from the user interacting with an application;
    determining a first emotional state of the user based on the facial recognition data of the user;
    receiving a request from the user to initiate a support call;
    identifying a second emotional state that increases a likelihood of achieving a specified outcome for the support call based on the first emotional state of the user;
    identifying, from a plurality of available support agents, an available support agent having the second emotional state; and
    matching the user to the available support agent having the second emotional state for the support call.

2. The computer-implemented method of claim 1, wherein the specified outcome is one or more of a duration of the support call less than a threshold duration or feedback providing an indication of a positive user experience during the support call.

3. The computer-implemented method of claim 1, wherein identifying the second emotional state that increases the likelihood of achieving the specified outcome for the support call comprises evaluating a history of each available support agent's emotional states responsive to different emotional states of users.

4. The computer-implemented method of claim 1, wherein identifying the available support agent having the second emotional state comprises evaluating a history of each available support agent's emotional states responsive to different emotional states of users.

5. The computer-implemented method of claim 1, further comprising:

receiving facial recognition data associated with the plurality of available support agents; and
    determining, for each respective available support agent of the plurality of available support agents, a third emotional state associated with the respective available support agent based on the facial recognition data associated with the plurality of available support agents.

6. The computer-implemented method of claim 5, wherein receiving the facial recognition data associated with the plurality of available support agents comprises receiving the facial recognition data associated with the plurality of available support agents after receiving the request from the user to initiate the support call.

7. The computer-implemented method of claim 5, wherein identifying the available support agent having the second emotional state comprises evaluating the facial recognition data associated with the plurality of available support agents.

8. A non-transitory computer-readable storage medium storing instructions, which when executed on a processor, perform an operation for matching a user of an application to a support agent, the operation comprising:
    receiving facial recognition data of a user captured from the user interacting with an application;
    determining a first emotional state of the user based on the facial recognition data of the user;
    receiving a request from the user to initiate a support call;
    identifying a second emotional state that increases a likelihood of achieving a specified outcome for the support call based on the first emotional state of the user;
    identifying, from a plurality of available support agents, an available support agent having the second emotional state; and
    matching the user to the available support agent having the second emotional state for the support call.

9. The non-transitory computer-readable storage medium of claim 8, wherein the specified outcome is one or more of a duration of the support call less than a threshold duration or feedback providing an indication of a positive user experience during the support call.

10. The non-transitory computer-readable storage medium of claim 8, wherein identifying the second emotional state that increases the likelihood of achieving the specified outcome for the support call comprises evaluating a history of each available support agent's emotional states responsive to different emotional states of users.

11. The non-transitory computer-readable storage medium of claim 8, wherein identifying the available support agent having the second emotional state comprises evaluating a history of each available support agent's emotional states responsive to different emotional states of users.

12. The non-transitory computer-readable storage medium of claim 8, the operation further comprising:
    receiving facial recognition data associated with the plurality of available support agents; and
    determining, for each respective available support agent of the plurality of available support agents, a third emotional state associated with the respective available support agent based on the facial recognition data associated with the plurality of available support agents.

13. The non-transitory computer-readable storage medium of claim 12, wherein receiving the facial recognition data associated with the plurality of available support agents comprises receiving the facial recognition data associated with the plurality of available support agents after receiving the request from the user to initiate the support call.

14. The non-transitory computer-readable storage medium of claim 12, wherein identifying the available support agent having the second emotional state comprises evaluating the facial recognition data associated with the plurality of available support agents.

15. A system, comprising:
   a processor; and
   a memory containing a program which, when executed on the processor, performs an operation for matching a user of an application to a support agent, the operation comprising:
      receiving facial recognition data of the user captured from the user interacting with the application;
      determining a first emotional state of the user based on the facial recognition data of the user;
      receiving a request from the user to initiate a support call;
      identifying a second emotional state that increases a likelihood of achieving a specified outcome for the support call based on the first emotional state of the user;
      identifying, from a plurality of available support agents, an available support agent having the second emotional state; and
      matching the user to the available support agent having the second emotional state for the support call.

16. The system of claim 15, wherein the specified outcome is one or more of a duration of the support call less than a threshold duration or feedback providing an indication of a positive user experience during the support call.

17. The system of claim 15, wherein identifying the second emotional state that increases the likelihood of achieving the specified outcome for the support call comprises evaluating a history of each available support agent's emotional states responsive to different emotional states of users.

18. The system of claim 15, wherein identifying the available support agent having the second emotional state comprises evaluating a history of each available support agent's emotional states responsive to different emotional states of users.

19. The system of claim 15, the operation further comprising:
   receiving facial recognition data associated with the plurality of available support agents; and
   determining, for each respective available support agent of the plurality of available support agents, a third emotional state associated with the respective available support agent based on the facial recognition data associated with the plurality of available support agents.

20. The system of claim 19, wherein identifying the available support agent having the second emotional state comprises evaluating the facial recognition data associated with the plurality of available support agents.

* * * * *

UNITED STATES PATENT AND TRADEMARK OFFICE
CERTIFICATE OF CORRECTION

Page 1 of 2

PATENT NO. : 10,264,127 B1
APPLICATION NO. : 15/947452
DATED : April 16, 2019
INVENTOR(S) : Amir Eftekhari et al.

It is certified that error appears in the above-identified patent and that said Letters Patent is hereby corrected as shown below:

In the Drawings

Please replace Fig. 7 with Fig. 7 as shown on the attached page.

Signed and Sealed this
Fifth Day of May, 2020

Andrei Iancu
*Director of the United States Patent and Trademark Office*